United States Patent [19]

Chow et al.

[11] 4,350,045

[45] Sep. 21, 1982

[54] APPARATUS AND METHOD FOR CHARACTERIZING AN ACOUSTIC FIELD

[75] Inventors: Chao-Kong Chow, Chappaqua; Chao-Ning Liu, Yorktown Heights; Sherman S. Wang, Poughkeepsie, all of N.Y.

[73] Assignee: International Business Machines Corporation, Armonk, N.Y.

[21] Appl. No.: 162,995

[22] Filed: Jun. 25, 1980

[51] Int. Cl.³ .............................................. G01N 29/00
[52] U.S. Cl. ........................................ 73/607; 73/618; 367/120
[58] Field of Search ................. 73/607, 618, 619, 659; 367/104, 120

[56] References Cited

U.S. PATENT DOCUMENTS 3,864,660  2/1975  Ranalli et al. ...................... 367/104
4,070,643  1/1978  Green .................................. 367/104
4,120,291  10/1978  Paton et al. .......................... 73/618

OTHER PUBLICATIONS

Data Acquisition System for Computer Aided Coherent Acoustic Imaging, by John P. Powers and Major Reid Carlock, Dec. 1979.

A Computerized Data Analysis System for Ultrasonic Tissue Characterization, by Joie Jones and Roger Kovack, Dec. 1979.

Primary Examiner—Anthony V. Ciarlante
Attorney, Agent, or Firm—Pollock, Vande Sande & Priddy

[57] ABSTRACT

An apparatus for and method of characterizing an acoustic field, and particularly of visually characterizing the field. An acoustic receiving transducer means is moved to a plurality of predetermined coordinate and angular positions in the acoustic field, and for each such position an electrical signal indicative of a parameter of the acoustic field is stored in a memory. The information in the memory is selectively retrieved to activate an electronic display means, and to expose film if desired, to provide a visual "map" of the acoustic field parameter detected.

2 Claims, 4 Drawing Figures

APPARATUS AND METHOD FOR CHARACTERIZING AN ACOUSTIC FIELD

DESCRIPTION

1. Field of the Invention

The present invention is directed to an improved apparatus for and method of characterizing an acoustic field, and particularly, of visually characterizing the field.

2. Background of the Invention

In recent years, the various applications in which acoustic energy is utilized have grown rapidly. For example, acoustic fields may be used in systems for studying the physical or chemical makeup of certain objects or specimens. In such systems, the waves are made incident on the object or specimen, and an analysis of wave behavior after transmission through or reflection from the specimen provides information about specimen properties.

In such applications, the acoustic wavefronts are frequently detected and visually characterized by a Schlieren optical system. This type of system is based on the fact that as the acoustic energy propagates through a transparent medium, the oscillating acoustic pressure at any point results in regular changes in the index of refraction of the medium. In the Schlieren apparatus, light is caused to traverse the acoustic medium, and is diffracted in accordance with the index of refraction variations caused by the propagating sound. An aperture stop is positioned so as to block undiffracted light which has traversed the medium so that only light which has been modulated by the acoustic energy reaches the output, which is indicent on photographic film to generate a Schlieren photograph, which is a qualitative "map" of acoustic field intensity.

While the Schlieren system of visualizing acoustic energy has been of some use in industry, it has several specific disadvantages. First, as indicated above, the Schlieren photograph usually provides only qualitative information about the sound field, quantitative information being provided only in the case of very simple field shapes. Second, the photograph is a two dimensional projection of a three dimensional field and thus does not completely characterize the field. Third, the system requires a relatively complex optical arrangement consisting of lenses, aperture, etc., and further, it has a limited sensitivity, and necessitates the use of a transparent medium.

SUMMARY OF THE INVENTION

It is thus an object of the present invention to provide an improved apparatus for and method of acoustic field characterization, and particularly of visual characterization.

It is a further object of the invention to provide an apparatus for and method of acoustic field characterization which quantitatively characterizes the field.

It is a further object of the invention to provide an apparatus for and method of acoustic field characterization which characterizes the field with six degrees of freedom.

It is still a further object of the invention to provide an apparatus for and method of acoustic field visual characterization which does not require the use of optics and/or a complicated configuration of components.

It is still a further object of the invention to provide an apparatus for and method of acoustic field characterization has a relatively high sensitivity.

It is still a further object of the invention to provide an apparatus for and method of acoustic field characterization which does not require the use of transparent media.

The above objects are accomplished by providing an apparatus and method which arranges for an acoustic receiving transducer means which converts acoustic energy into an electrical signal to be moved to a plurality of predetermined positions in an area of interest in the acoustic energy field. If it is desired to characterize the acoustic field amplitude, then the peak amplitude of the transducer output signal at each predetermined position after being digitized is stored in a memory, while if it is desired to characterize acoustic field frequency spectrum, then signals indicative of such frequency spectrum at each predetermined position are stored in the memory. To effect visual characterization of the field, the stored information is processed for appropriate activation of an electronic display means. If a permanent record of the visual characterization of the field is desired, then a photographic recording is made from the image provided by the electronic display means.

In a preferred embodiment of the invention, the receiving acoustic transducer means is moved to discrete positions with six degrees of freedom. That is, electrical stepping means are provided to move the transducer means in a predetermined, systematic manner to a plurality of x, y, z coordinate positions in the acoustic field, and at each x, y, z coordinate position means are provided to rotate the transducer means in three angular directions to a plurality of angular positions. Thus, a complete "map" of the acoustic field is obtained in storage, and various selected information may be retrieved from storage to achieve desired displays.

For certain applications, an acoustic source transducer means is provided as part of the system, and is controlled to provide selected acoustic fields, which are characterized by the remainder of the system as described above.

BRIEF DESCRIPTION OF THE DRAWINGS

The invention will be better understood by referring to the accompanying drawings, in which.

DETAILED DESCRIPTION OF EMBODIMENTS

Figure 1:
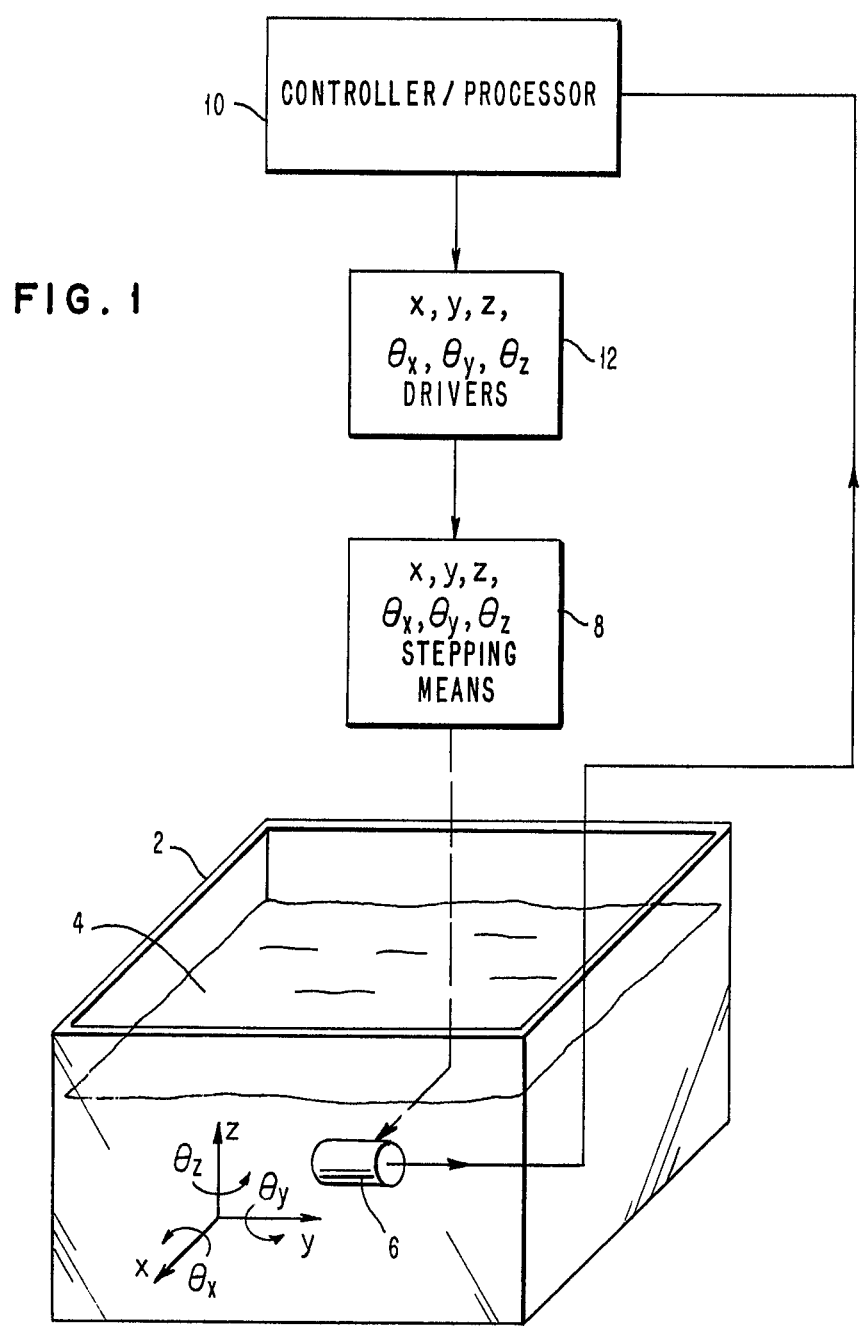
FIG. 1 is a schematic representation of an overview of an embodiment of the present invention.

Referring to FIG. 1, tank 2 contains a liquid 4 such as water in which an acoustic field which it is desired to characterize is propagating. This field may result from either a known or an unknown source, and typically might be an acoustic field generated by a controlled source which is being detected after having been transmitted through a specimen which is being tested. It should be understood that while the invention is illustrated in connection with acoustic propagation through a liquid because of acoustic attenuation problems encountered with gases, it may be used in a gaseous environment if sufficient signal strength is present.

In accordance with the invention, an acoustic receiving transducer means 6, which for example could be a piezoelectric crystal transducer is mounted for movement to a plurality of predetermined positions within the medium 4. At each position, a parameter of the acoustic field, for example the amplitude, or frequency spectrum of the field is detected, and the detected value or values are stored. At appropriate times the information is read from storage and is used to activate an electronic display means which displays the detected acoustic field parameter.

Referring again to FIG. 1, controller/processor 10 which may be a programmed general purpose computer or a minicomputer or microcomputer, controls the set of predetermined field positions to which transducer 6 is moved. The controller feeds drivers 12 which control stepping means 8 to move the transducer in discrete steps to the desired positions. In the preferred embodiment, the stepping means 8 is arranged to be not only capable of moving the transducer to selected x, y, z coordinates in the field, but to also be able to rotate the transducer to a plurality of angular positions through angles $\theta_x$, $\theta_y$, $\theta_z$, thus providing a system capable of movement with six degrees of freedom.

Figure 2:
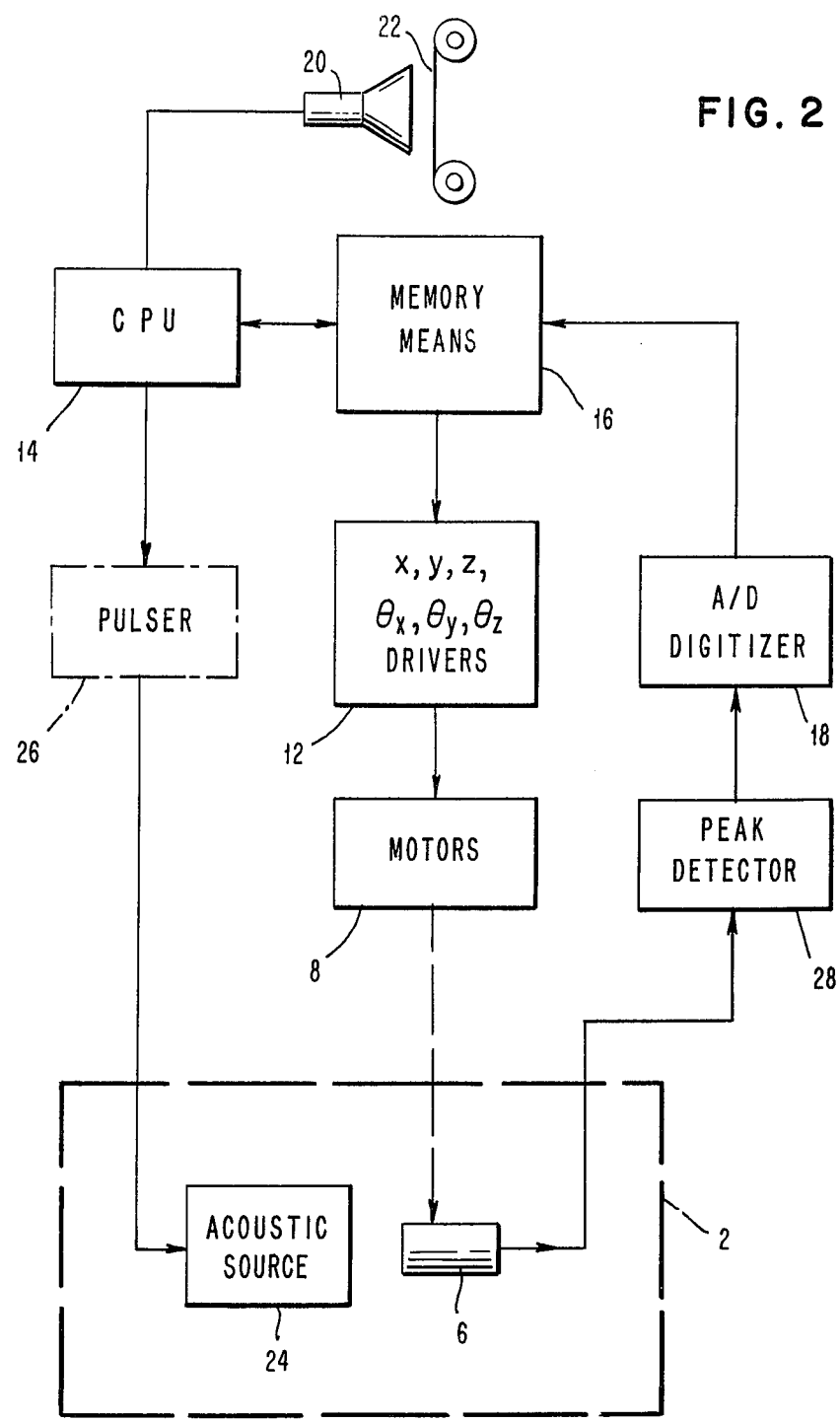
FIG. 2 is a more detailed block diagram of an embodiment of the present invention.

FIG. 2 is a more specific block diagram of an embodiment of the invention for characterizing the amplitude distribution of the acoustic field. Referring to the Figure, it will be appreciated that the controller/processor 10 of FIG. 1 includes central processing unit 14 and memory means 16. The memory means has information stored therein indicative of the predetermined positions and the sequence thereof which comprise the path of travel which it is desired for acoustic transducer means 6 to perform. Such travel is executed upon commands which are issued by central processing unit 14 to memory 16, drivers 12 and motors 8. Programs for accomplishing desired movement of the acoustic receiver are within the knowledge of those in the art, and for instance are extensively used in the precision machine tool control art.

One exemplary path of transducer travel which has proven to be useful in acoustic field mapping work is the movement of transducer means 6 through a plurality of positions in one coordinate direction, for example the x direction while holding the other two coordinates constant, then movement again in the x direction for a new value of y, and so on until the area of interest in two dimensions is mapped, and then repeating the same process for a plurality of different z coordinates. At each discrete coordinate position, the transducer may be rotated through a plurality of discrete angular positions in three angular degrees of freedom. This type of routine develops the most amount of information about the acoustic field and is particularly useful when it is not known which direction the acoustic field is coming from, as the angular rotation may be used to establish the maximum field value at each x, y, z coordinate position. The stored information may then be used to produce an image of the field maximum for selected planes, lines, or coordinates.

At each discrete coordinate/angular position to which the piezoelectric transducer is stepped, it generates an analog electrical signal having an amplitude which is proportional to the intensity of the acoustic field at that position. The peak of this signal is detected by peak detector 28. Such peak signals are converted to digital form in A/D digitizer 18, and under the control of CPU 14, are routed to appropriate storage locations in memory means 16. Memory means 16 is arranged to have an address corresponding to each predetermined coordinate/angular position in the acoustic field, and the field values which are outputted by digitizer 18 are stored at the appropriate addresses. After storage of intensity values of the entire acoustic field, or of a portion of the acoustic field of interest, selected information may be read out of memory for display. For example, as mentioned above, it may be desired to display the field maxima for a selected x, y plane, or if desired, the field average or mean for a selected plane or line. It should be appreciated that these examples of possible display information are intended to be illustrative only, as since all field values may be stored, the particular set of values which are extracted and displayed depends on the needs of the particular application and/or the interests of the particular user. Of course, the present invention also contemplates embodiments in which information in less than six degrees of freedom is stored as well as systems where the path of travel of the transducers is other than the straight-line type of path described above.

The information which is retrieved from memory is arranged to activate an electronic display means, which is illustratively depicted as being cathode ray tube 20 in FIG. 2. If a photographic record of the field map is desired, then the displayed output of cathode ray tube 20 may be used to expose film 22, to produce a photograph which provides more and better information than the prior art Schlieren photograph discussed above.

In some applications, it will be necessary to generate the acoustic field, which is then characterized either after passage through or reflection from a specimen, or after being directly received from the transducer if the source transducer itself or the medium is being tested.

In such cases it is advantageous to arrange the controller to also control the signal which is applied to the source transducer so that the generation and reception of the field by the respective acoustic transducers may be coordinated. In FIG. 2, acoustic source means 24 is shown which may also be a piezoelectric transducer, and is controlled by CPU 14. In the arrangement shown, pulser 26 is utilized to produce a pulsed acoustic field, which would require gating of acoustic receiving means 6 at appropriate times. Alternatively, a continuous signal could be applied to source means 24 in which case a continuous wave would propagate in the transmission medium.

The programming for performing the above-described functions is well-known to those skilled in the art. For example, programs for achieving desired movement of the acoustic receiving transducer means are similar to those which are extensively used in the precision automatic machine tool control art, and programs for retrieving and processing selected information from memory for display are routinely used in computer storage and retrieval systems.

Figure 3:
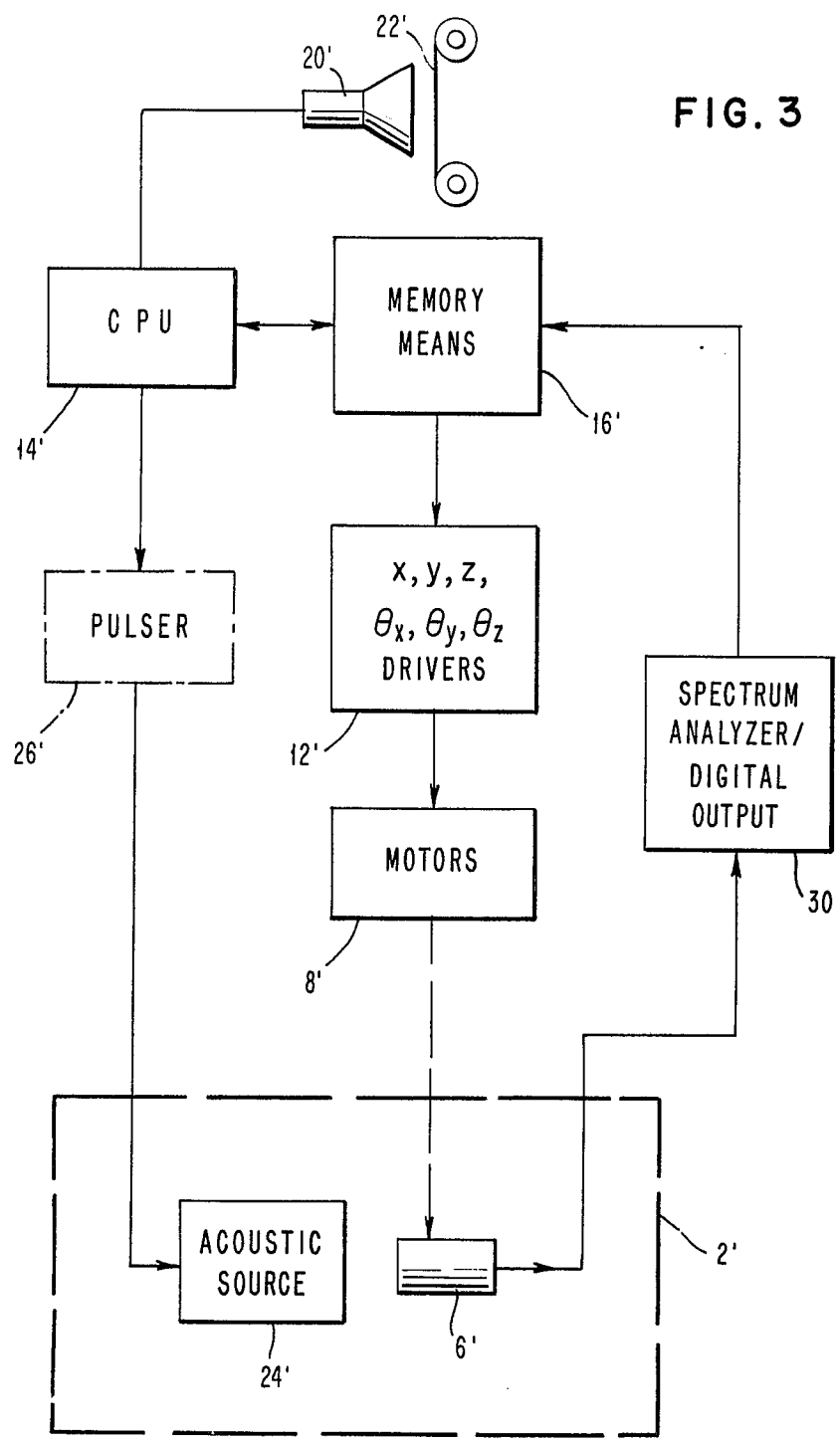
FIG. 3 is a more detailed block diagram of a further embodiment of the present invention.

FIG. 3 illustrates an embodiment of the invention which is used to characterize the frequency spectrum of the acoustic field. One application in which such a system would be useful is where human and animal tissue is tested with acoustic energy to determine if the tissue is diseased. Since diseased tissue changes the frequency spectrum of ultrasonic energy passing through it in a different manner than normal tissue, an image of the transmission frequency distribution may aid medical diagnosis.

FIG. 3, wherein numerals corresponding to those present in FIG. 2 are used, is seen to be similar to FIG. 2, except that spectrum analyzer 30 is used in place of peak detector 28 and digitizer 18. If both the source and receiver transducers are of the piezoelectric crystal type, they generate and are responsive to a narrow band of frequencies. Thus, the output signal of receiver transducer 6' at each coordinate/angular position has a magnitude which is proportional to the amplitude of the acoustic wave and a frequency spectrum which is similar to the frequency spectrum of the wave. In the embodiment of FIG. 3, the transducer output signal is fed to spectrum analyzer 30 which determines the frequency spectrum of the signal inputted thereto. Since analyzer 30 is selected to be of the type having a digital output, it typically has a plurality of output registers or equivalent means, each register representing a different frequency and being effective to output a digital number which corresponds to the magnitude of the frequency component which the register represents.

The digital numbers corresponding to the strengths of the frequency components may be outputted from spectrum analyzer 30 in either parallel or serial form, and are fed to memory means 10 where they are stored at addresses corresponding to the respective scanning positions in the acoustic field. Since a plurality of frequency component amplitude values may be stored for each scanning position, a selection of a single value would typically be made for display. While the specific nature of the selection would depend on the particular application, in general the amplitude at a single selected frequency component for all points in the field would be displayed at any one time, and the processor would be arranged to sequentially display the amplitude values at each of the different frequencies of interest, so that the entire frequency spectrum is ascertained from the sequential displays. Further, useful information about the frequency spectrum may be displayed in a single frame if the values stored in memory are combined in a predetermined fashion. For example, it is known that valuable information is afforded from display of the values corresponding to the slopes of the best straight line approximations of the frequency spectra at the various field positions, and in this case the processor would be programmed to perform the appropriate calculations.

Figure 4:
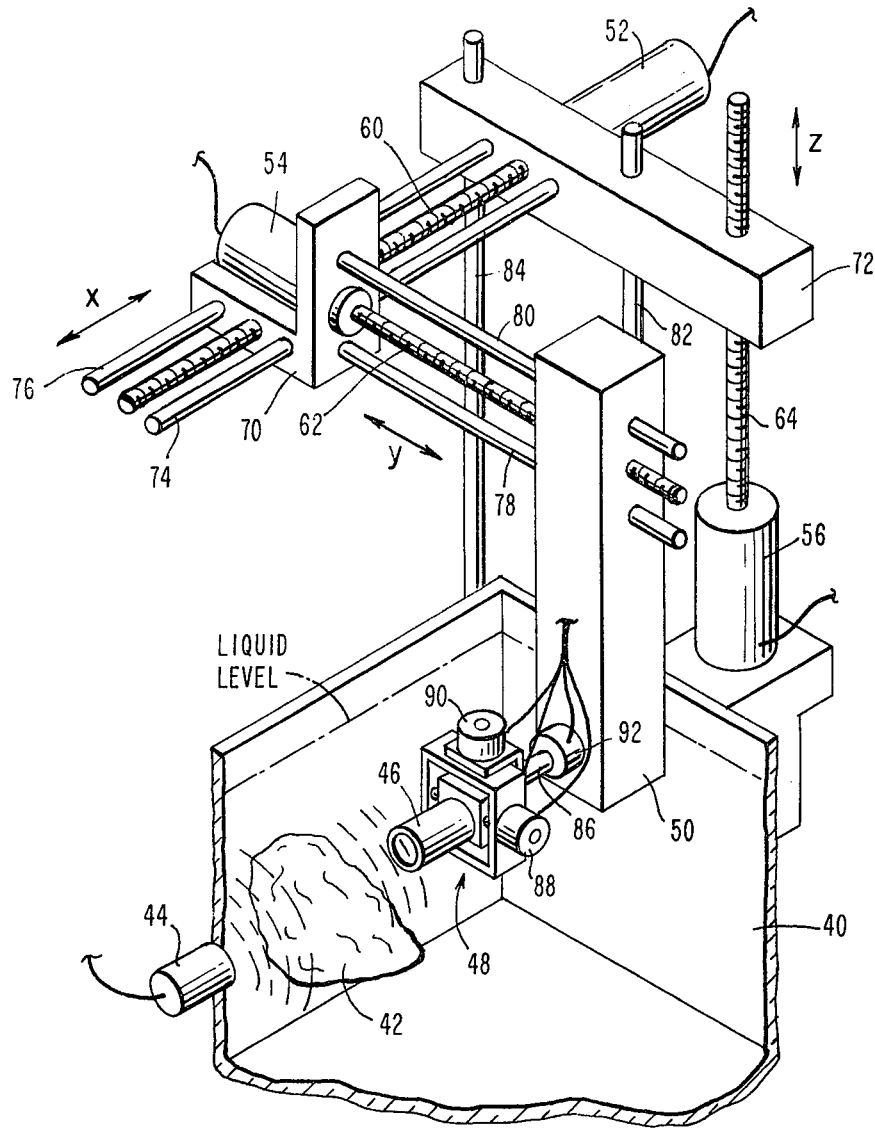
FIG. 4 is a perspective view of an illustrative electromechanical arrangement for achieving six degrees of freedom in movement of the receiving transducer means.

FIG. 4 is a perspective view of an illustrative electromechanical apparatus for moving a receiving transducer means in six degrees of freedom. Referring to the Figure, tank 40 is provided which contains water or other appropriate fluid, and is similar to tank 2 which is shown in FIG. 1. A specimen 42 is disposed in the liquid in the tank and is irradiated with acoustic energy which is generated by source transducer means 44. It is desired to characterize the acoustic field which is transmitted by specimen 42, and in this respect receiving transducer means 46 is provided, and is moved to predetermined x, y, z and $\theta_x$, $\theta_y$ and $\theta_z$ coordinates by the illustrative apparatus shown.

The receiving transducer 46 is mounted on assembly 48 which is in turn secured to vertically disposed bar 50. The x, y and z coordinates of bar 50, and thus of the receiving transducer 46 are controlled by stepping servo motors 52, 54 and 56, respectively. Each of the servo motors is fed from the drivers 12 shown in FIGS. 1-3, which in turn are controlled by the controlling computer to move the receiving transducers to the predetermined discrete positions in the tank.

The shafts of the respective servo motors 52, 54, and 56 are comprised of lead screws 60, 62, and 64 respectively, which are effective to move elements 70, 50, and 72 respectively in the respective x, y, and z directions upon rotation of the motors. Each of the elements 70, 50, and 72 are mounted for movement on a plurality of guide rods as well as on the lead screws, and such guide rods are designated by numerals 74–84 in FIG. 4.

To effect angular rotation, the receiving transducer 46 is secured to gimbal assembly 48 for providing pitch and yaw motion, and the gimbal assembly is in turn mounted on shaft 86 for providing roll motion. Pitch and yaw stepping servo motors 88 and 90 are provided for rotating the shafts of the gimbal assembly in appropriate angular steps received from the drivers, while roll motor 92 is provided for rotating shaft 86.

Thus, upon activation by appropriate signals received from the drivers, the electro-mechanical apparatus shown in FIG. 4 is effective to move the receiving transducer through a plurality of discrete steps in a predetermined path with six degrees of freedom.

There thus has been described an improved apparatus for and method of characterizing an acoustic field which has many advantages over the prior art system.

It should be understood that while we have described certain embodiments of the invention, we do not intend to be restricted thereto, but rather intend to cover all variations and modifications which come within the spirit of the invention, which is limited only by the claims which are appended hereto.

Having thus described my invention, what I claim as new, and desire to secure by Letters Patent is:

1. An apparatus for characterizing an acoustic field in a medium, comprising:
acoustic source transducer means disposed in said medium for generating acoustic energy resulting in said acoustic field to be characterized,
acoustic receiving transducer means physically separated in said medium from said source means for converting a parameter of the acoustic energy of said field to a corresponding electrical signal,
means for moving said acoustic receiving transducer means in steps to a plurality of predetermined X,Y,Z coordinate positions in an area of interest in said acoustic field, said means for moving including means for rotating said transducer means in steps to a plurality of angular positions at each X,Y,Z coordinate position in three different angular directions,
means for storing the electrical signals provided by said transducer means or signals derived from said electrical signals for each of said plurality of positions, and display means for providing a visual image of said stored electrical signals, whereby said acoustic field is characterized.

2. The apparatus of claim 1, wherein said parameter of acoustic energy is the frequency spectrum of said acoustic energy.

* * * * *